(12) United States Patent
Mathew

(10) Patent No.: US 10,182,464 B2
(45) Date of Patent: Jan. 15, 2019

(54) METHOD, DEVICE AND TEST SETUP FOR IMPLEMENTING CARRIER AGGREGATION

(71) Applicant: Keysight Technologies Singapore (Holdings) Pte. Ltd., Singapore (SG)

(72) Inventor: Binu Mathew, Fleet (GB)

(73) Assignee: Keysight Technologies Singapore (Sales) Pte. Ltd., Singapore (SG)

( * ) Notice: Subject to any disclaimer, the term of this patent is extended or adjusted under 35 U.S.C. 154(b) by 0 days.

(21) Appl. No.: 15/109,806

(22) PCT Filed: Feb. 3, 2015

(86) PCT No.: PCT/GB2015/050284
§ 371 (c)(1),
(2) Date: Jul. 5, 2016

(87) PCT Pub. No.: WO2015/118314
PCT Pub. Date: Aug. 13, 2015

(65) Prior Publication Data
US 2016/0330783 A1  Nov. 10, 2016

(30) Foreign Application Priority Data

Feb. 4, 2014  (GB) .................................. 1401907.9

(51) Int. Cl.
*H04W 76/15* (2018.01)
*H04L 5/00* (2006.01)
(Continued)

(52) U.S. Cl.
CPC ............ *H04W 76/15* (2018.02); *H04B 7/063* (2013.01); *H04B 7/0626* (2013.01); *H04L 1/24* (2013.01);
(Continued)

(58) Field of Classification Search
CPC ...... H04B 17/00; H04B 7/0626; H04B 7/063; H04L 1/0031; H04L 1/24; H04L 5/0003;
(Continued)

(56) References Cited

U.S. PATENT DOCUMENTS

2011/0159799 A1\* 6/2011 Chen .................... H04L 1/1867
455/3.01
2011/0279424 A1\* 11/2011 Lin ........................ G09G 5/008
345/205
(Continued)

FOREIGN PATENT DOCUMENTS

GB       2504293 A     7/2012
WO    2010016698 A2    2/2010
(Continued)

OTHER PUBLICATIONS

CATT) NPL Document "Further discussion on periodic Feedback" 3GPP, Mobile Competence Center5, Aug. 2012, pp. 1-4.\*
(Continued)

*Primary Examiner* — Mewale Ambaye

(57) ABSTRACT

There is provided a method of implementing carrier aggregation on a first transceiver. The method comprises receiving and decoding, during a first subframe, channel quality information from user equipment and transferring, before the expiry of a second subframe immediately following the first subframe, the decoded channel quality information over a direct physical link to a second transceiver, for use in decoding further channel quality information from the user equipment.

8 Claims, 2 Drawing Sheets

(51) Int. Cl.
*H04B 7/06* (2006.01)
*H04L 1/24* (2006.01)
*H04W 76/02* (2009.01)
*H04L 1/00* (2006.01)

(52) U.S. Cl.
CPC .......... *H04L 5/0003* (2013.01); *H04L 5/0035* (2013.01); *H04L 5/0048* (2013.01); *H04L 5/0094* (2013.01); *H04W 76/025* (2013.01); *H04L 1/0031* (2013.01)

(58) Field of Classification Search
CPC ... H04L 5/0035; H04L 5/0048; H04L 5/0094; H04W 76/02
See application file for complete search history.

(56) References Cited

U.S. PATENT DOCUMENTS

2013/0279424 A1   10/2013  Lee et al.
2013/0322376 A1   12/2013  Marinier et al.

FOREIGN PATENT DOCUMENTS

WO     2011100673 A1   8/2011
WO     2013/166699 A1  11/2013

OTHER PUBLICATIONS

CATT: "Further discussion on periodic feedback", 3GPP Draft; R-123216, 3rd Generation Partnership Project (3GPP), Mobile Competence Centre, vol. Ran WG1, Aug. 5, 2012, pp. 1-4.
Fujitsu: "Considerations on PMI feedback delay", 3GPP Draft; R4-090795, 3rd Generation Partnership Project (3GPP), Mobile Competence Centre, Feb. 6, 2009, pp. 1-4.
Samsung: "Control signaling to support Re. 10 feedback framework", 3GPP Draft; R1-103667 Controal for Feedback Final, 3rd Generation Partnership Project (3GPP), Mobile Competence Centre, vol. RAN WG1, Jun. 24, 2010, pp. 1-13.
Huawei et al: "Framework for multi-point CSI feedback enhancements for CoMP", GPP Draft; R1-112896, 3rd Generation Partnership Project (3GPP), Mobile Competence Centre, vol. RAN WGS1, Oct. 4, 2011, pp. 1-9.
GB Examination Report dated Jan. 8, 2016.
International Search Report dated Apr. 8, 2015.
Notification of Grant for Application No. GB2522846 dated Jul. 5, 2016.
GB Search Report dated Jul. 7, 2014, 8 pgs.
International Preliminary Report dated Aug. 18, 2016, 1 pg.
Written Opinion of the International Search Authority dated Aug. 13, 2015, 9 pgs.

* cited by examiner

METHOD, DEVICE AND TEST SETUP FOR IMPLEMENTING CARRIER AGGREGATION

The present application is a U.S. national phase application under 35 U.S.C. § 371(c) of International Patent Application No. PCT/GB2015/050284 filed on 3 Feb. 2015, naming Binu Mathew as inventor. Priority is claimed under 35 U.S.C. § 365 from International Patent Application No. PCT/GB2015/050284, and the entire disclosure of International Patent Application No. PCT/GB2015/050284 is specifically incorporated herein by reference in its entirety.

The invention relates to a method of implementing carrier aggregation, a transceiver, a test setup, and a method of examining the performance of user equipment operating according to one or more predefined standards, for example the 3GPP standard.

BACKGROUND

Test setups running protocol compliance toolsets may be used to examine the performance of user equipment operating according to one or more predefined standards, for example to test and certify that user equipment conforms to the relevant standard(s). The toolsets may be used to define scripts representing configuration scenarios and to run interoperability tests and development tests to examine conformance. For example, a system for emulating LTE-Advanced Carrier Aggregation can be provided, in which the Component Carriers (base stations or cells) being aggregated reside on multiple hardware units or transceivers.

LTE-Advanced Carrier Aggregation is a 3GPP Release 10 feature introduced to increase the data rates which can be achieved by a connected device such as an LTE-Advanced capable mobile (UE). With Carrier Aggregation, UE is simultaneously connected to multiple cells (referred as Component Carriers in 3GPP terminology). A maximum of 5 such Component Carriers can be aggregated. Both intra- and inter-band Carrier Aggregation is envisaged i.e. the cells being aggregated can be on different RF frequencies. Some emulation scenarios for Carrier Aggregation are implemented by interconnecting multiple transceiver units implementing the physical layer of the aggregated Component Carriers. These multiple transceiver units are controlled by a common MAC scheduler via an interconnect mechanism such as an Ethernet switch.

When in a connected state with the network, UE can be configured to periodically send channel status information about the quality of the channel as affected by propagation conditions and interfering sources. Such channel status information is of different types:

a) Rank Indicator/Precoding Type Indicator (RI/PTI) bits, which indicate the optimum number of independent downlink data streams which can be received at the UE;

b) Channel Quality Indicator/Precoding Matrix Indicator (CQI/PMI) bits, which provide a measure of the interference conditions and preferred ratios of information bits versus channel capacity (channel coding rate).

Some emulation scenarios require implementation of configurations where values of periodic CQI/PMI are conditioned by the last reported values of RI/PTI. Hence, the most recently reported value of RI/PTI is necessary to ensure successful decoding of subsequent subframes with CQI/PMI transmissions.

SUMMARY

The inventor has made the discovery through analysis and creation of a large number of unique configuration scenarios that some scenarios require implementation of configurations in which periodic RI/PTI and CQI/PMI are reported by the UE in consecutive subframes, on separate Component Carriers, which may be implemented on separate transceiver units. The term "subframe" in LTE and LTE-Advanced terminology refers to a time unit of one millisecond and is a basic unit of downlink/uplink transmissions to/from the UE. However, it is to be understood that the term subframe as used in the claims is not so limited and may refer to other time periods.

In the scenarios described above, it would be necessary to transfer the decoded RI/PTI from the transceiver receiving the RI/PTI to the transceiver expected to receive the subframe with CQI/PMI as quickly as possible. If excessive latency/delay occurs, for example due to communication with the common MAC scheduler, then the transceiver expected to receive the subframe with CQI/PMI will be unable to successfully decode the CQI/PMI and/or data bits received in that subframe. This will trigger connection failures to the UE.

Owing to his discovery, the inventor is able to address the non-obvious problem of reducing latency for RI/PTI transfer, a problem which is not known or obvious from the available prior art and which is addressed by the invention described in this document. Inc invention may provide a dedicated Serial Peripheral Interface (SPI) link for interconnecting the transceivers, for example in a daisy-chain fashion. A firmware-defined RI/PTI controller module implemented on each transceiver may be provided to control configuration of RI/PTI for uplink transmissions expected from the UE without the need to involve a common scheduler coil entity, which conventional wisdom dictates as being necessary in such arrangements.

According to a first aspect, there is provided a method of implementing carrier aggregation on a first transceiver, the method comprising:

receiving and decoding, during a first subframe, channel quality information from user equipment and transferring, before the expiry of a second subframe immediately following the first subframe, the decoded channel quality information over a direct physical link to a second transceiver, for use in decoding further channel quality information from the user equipment.

The direct physical link may comprise a serial peripheral interface link, and the method may comprise controlling the serial peripheral interface link to perform the transfer of decoded channel quality information.

According to a second aspect, there is provided a first transceiver configured to carry out the method of the first aspect.

According to a third aspect, there is provided a test setup configured to examine the performance of user equipment operating according to one or more predefined standards, the test setup comprising:

the first transceiver of the second aspect, configured to emulate a base station and to communicate with the user equipment under test according to a predefined test script representing a configuration scenario.

The test setup may be configured to run one or more of a conformance toolset, an interoperability testing toolset, a development toolset, and a protocol compliance toolset, where those toolsets are implemented in software. Additionally or alternatively, the toolsets may be implemented in hardware, or in any one or more of hardware, software and firmware.

Examining the performance of user equipment operating according to one or more predefined standards may comprise examining the conformance of the user equipment with those standards, for example. In other examples, examining performance may comprise examining for interoperability or for development purposes.

The test setup may comprise the second transceiver connected to the first transceiver by the direct link, at least one further transceiver and at least one further direct link, wherein the direct links interconnect the transceivers in a daisy chain.

According to a fourth aspect, there is provided a computer-readable medium comprising stored thereon instructions which, when executed by a computer, cause the computer to carry out the method of the first aspect. The instructions may be implemented for example in software, firmware, or both. In one example, there may be provided a software module comprising a controller module which provides configuration information to a firmware module which performs decode operations (for example decoding of RI/PTI and CQI/PMI).

According to a fifth aspect, there is provided a method of examining the performance of user equipment operating according to one or more predefined standards, the method comprising:

emulating a base station using a first transceiver configured to communicate with user equipment under test according to a predefined test script representing a configuration scenario; and performing the method of the first aspect.

The claimed subject-matter may facilitate the design and implementation of radio transceivers which support LTE-Advanced Carrier Aggregation without restrictions on uplink scheduling configurations.

The present invention includes one or more aspects, embodiments or features in isolation or in various combinations whether or not specifically stated (including claimed) in that combination or in isolation.

The above summary is intended to be merely exemplary and non-limiting.

BRIEF DESCRIPTION OF THE DRAWINGS

A description will now be given, by way of example only, with reference to the accompanying drawings, in which.

DETAILED DESCRIPTION

Figure 1:
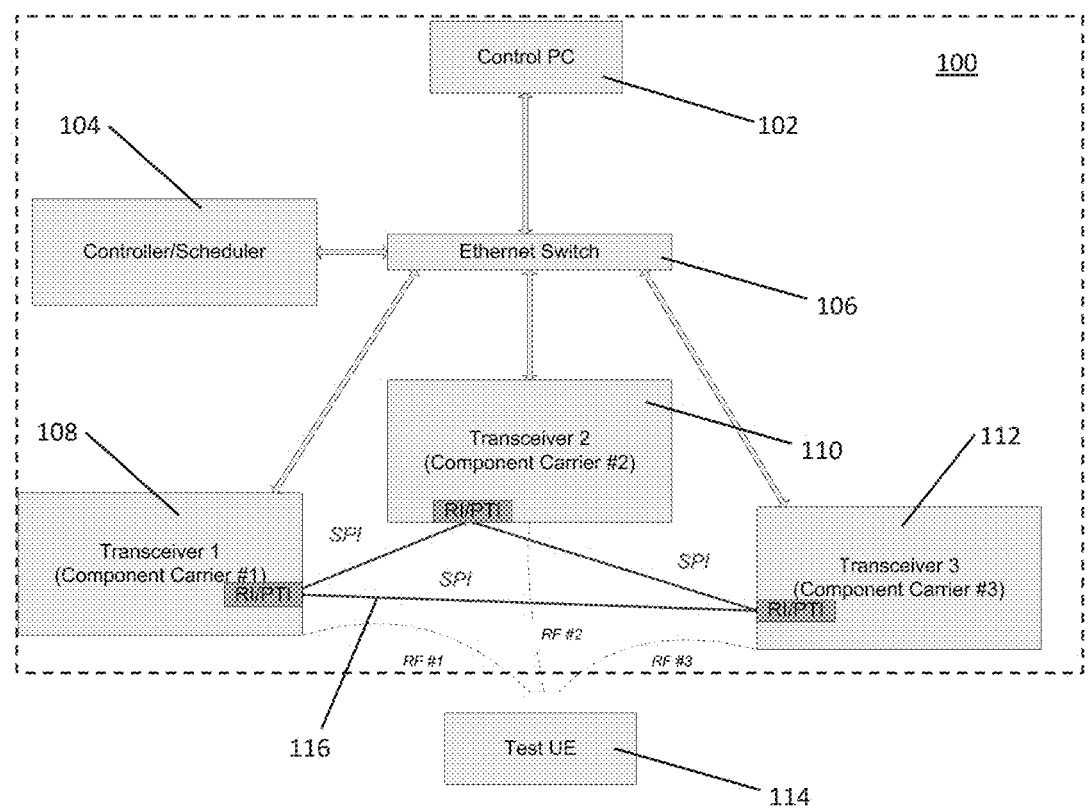
FIG. 1 is a diagram illustrating a test setup running a protocol compliance toolset being used to examine conformance of user equipment with predefined standards.

The test setup 100 comprises a control PC 102 for effecting overall control of the system, an Ethernet switch 106 managed by a controller/scheduler 104 for handling communications between the transceivers, and three transceivers being a first transceiver 108, a second transceiver 110 and a third transceiver 112. Although FIG. 1 shows three transceivers, it is to be understood that any number of transceivers can be interconnected depending on the carrier aggregation scenario, with for example anywhere between 2-5 transceivers being interconnected.

User equipment 114 under test is also shown, and communicates with the first transceiver 108 using a first RF link with the second transceiver 110 using a second RF link RF#2, and with the third transceiver 112 using a third RF link RF#3. The first transceiver 108 emulates a first component carrier, the second transceiver 110 emulates a second component carrier, and the third transceiver 112 emulates a third component carrier.

As part of LTE-Advanced Carrier Aggregation the user equipment 114 may be simultaneously connected to multiple component carriers to increase data rates, and the protocol compliance toolset implements emulation scenarios for Carrier Aggregation, with the interconnected multiple transceivers 108, 110, 112 implementing the physical layer of the aggregated Component Carriers under the control of the controller/scheduler 104 via the Ethernet switch 106.

The control and configuration of the physical layer as implemented on the multiple transceivers 108, 110, 112, along with the scheduling of user data, are performed by the controller/scheduler 104.

When in a connected state with the network, the user equipment 114 can be configured to periodically send channel status information about the quality of the channel as affected by propagation conditions and interfering sources. Such channel status information may include.

a) Rank Indicator/Precoding Type Indicator (RI/PTI) hits, which indicate the optimum number of independent downlink data streams which can be received at the UE;

b) Channel Quality Indicator/Precoding Matrix Indicator (CQI/PMI) bits, which provide a measure of the interference conditions and preferred ratios of information bits versus channel capacity (channel coding rate).

Depending on scheduler operation, uplink transmissions from the user equipment 114 can be scheduled on component carriers emulated on separate transceivers 108, 110, 112 in consecutive subframes. Under specific configuration conditions, decoded RI/PTI bits received from the user equipment 114 in a particular subframe can be necessary for decoding CQI/PMI bits in the very next subframe.

In order to reduce the latency of sharing the RI/PTI values across the multiple transceivers 108, 110, 112, each of the transceivers 108, 110, 112 is provisioned with a dedicated, direct physical link, in the form of a Serial Peripheral interface (SPI) link 116, for interconnecting the transceivers 108, 110, 112 in a daisy-chain fashion. RI/PTI values decoded on each transceiver 108, 110, 112 are shared amongst the multiple transceivers participating in Carrier Aggregation using the SPI link 116, for example by being broadcast to all transceivers 108, 110, 112 along the daisy chair. Three such SPI links 116 interconnecting the three transceivers 108, 110, 112 are shown in FIG. 1.

Figure 2:
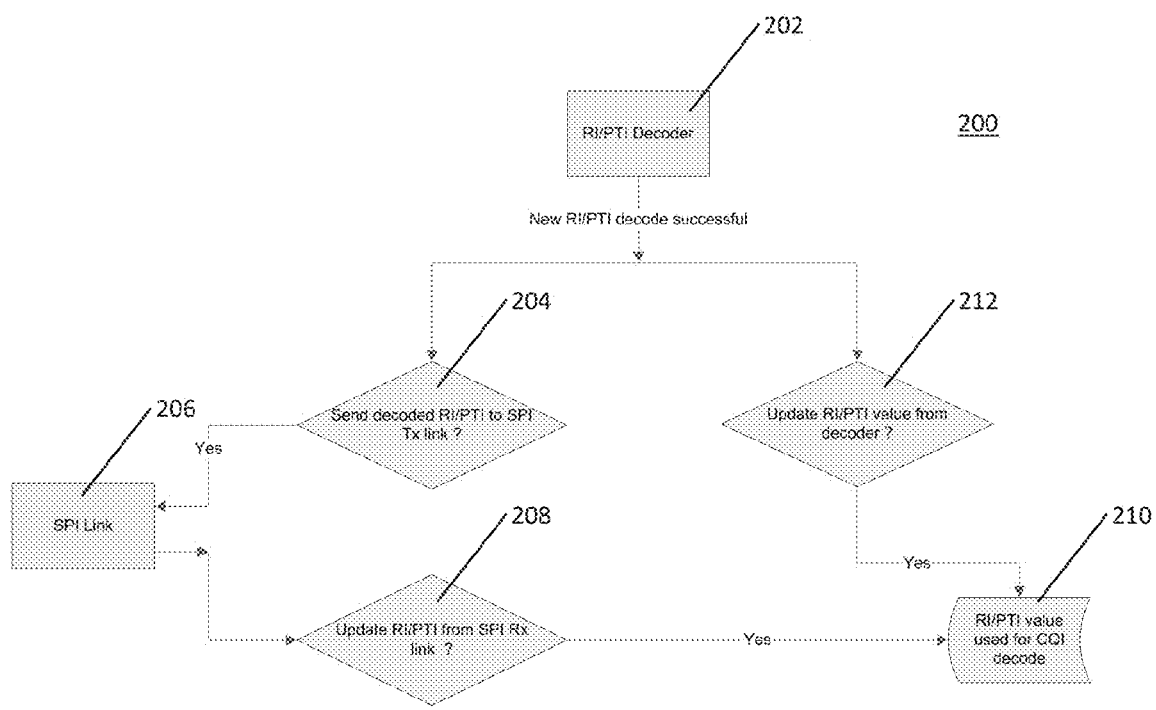
FIG. 2 is a flowchart representing part of a method of implementing carrier aggregation.

FIG. 2 shows part of a method of implementing carrier aggregation. The method includes decoding RI/PTI bits (202), before determining (204) whether or rot to transmit (206) the decoded RI/PTI bits to a further transceiver over the SPI link 116. The determination (204) may depend on higher layer configuration as defined by test script/configuration whether the transceiver is part of a carrier aggregation set. This information is available to the controller/scheduler 104 as part of configuration information. The received, decoded RI/PTI bits may be used in an update by the receiving transceiver (208), before being used to decode CQI values (210). The controller/scheduler 104 may provide configuration information determining whether the update (208) needs to be executed on a particular transceiver for a particular subframe. In a parallel pathway, the decoded RI/PTI bits are used in an update at the decoding transceiver (212), since, depending on the test configuration, the CGI/PMI can be received on the same transceiver as that on which the RI/PTI was received.

It will be appreciated that the aforementioned circuitry may have other functions in addition to the mentioned functions, and that these functions may be performed by the same circuit.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the an that various modifications may be made within the scope of the invention.

The invention claimed is:

1. A method of implementing carrier aggregation on a first transceiver in a test setup to examine performance of user equipment, the method comprising:
    receiving and decoding at the first transceiver, during a first subframe, channel quality information from the user equipment, and transferring, before expiry of a second subframe immediately following the first subframe, the decoded channel quality information over a direct physical link to a second transceiver, for use by the second transceiver in decoding further channel quality information from the user equipment.

2. The method of claim 1, wherein the direct physical link comprises a serial peripheral interface link, and the method further comprises controlling the serial peripheral interface link to perform the transfer of decoded channel quality information.

3. A first transceiver configured to implement carrier aggregation in a test setup to examine performance of user equipment, the first transceiver comprising:
    a receiver portion configured to receive and decode, during a first subframe, channel quality information from user equipment, and to transfer, before expiry of a second subframe immediately following the first subframe, the decoded channel quality information over a direct physical link to a second transceiver, the decoded channel quality information being useable by the second transceiver to decode further channel quality information from the user equipment.

4. A test setup configured to examine performance of user equipment operating according to one or more predefined standards, the test setup comprising:
    the first transceiver of claim 3, configured to emulate a base station and to communicate with the user equipment under test according to a predefined test script representing a configuration scenario.

5. The test setup of claim 4, further comprising the second transceiver connected to the first transceiver by the direct link, at least one further transceiver and at least one further direct link the first transceiver, the second transceiver and the at least one further transceiver in a daisy chain.

6. A non-transitory computer-readable medium storing instructions, executable by a computer processor, for performing the method of implementing carrier aggregation of claim 1.

7. A method of examining performance of user equipment operating according to one or more predefined standards, the method comprising:
    emulating a base station using a first transceiver configured to communicate with the user equipment under test according to a predefined test script representing a configuration scenario; and
    receiving and decoding, during a first subframe, channel quality information from user equipment, and transferring, before expiry of a second subframe immediately following the first subframe, the decoded channel quality information over a direct physical link from the first transceiver to a second transceiver, for use in decoding further channel quality information from the user equipment.

8. The transceiver of claim 3, wherein the direct physical link comprises a serial peripheral interface link, and the first transceiver is configured to control the serial peripheral interface link to perform the transfer of the decoded channel quality information.

* * * * *